(12) United States Patent
Ikegami

(10) Patent No.: US 11,861,992 B2
(45) Date of Patent: Jan. 2, 2024

(54) INFORMATION PROCESSING APPARATUS AND CONTROL PROGRAM THEREFOR

(71) Applicant: TOSHIBA TEC KABUSHIKI KAISHA, Tokyo (JP)

(72) Inventor: Fumihiko Ikegami, Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 36 days.

(21) Appl. No.: 17/750,048

(22) Filed: May 20, 2022

(65) Prior Publication Data

US 2023/0042348 A1 Feb. 9, 2023

(30) Foreign Application Priority Data

Aug. 6, 2021 (JP) .................................. 2021-129746

(51) Int. Cl.
  *G06F 8/60* (2018.01)
  *G06F 8/65* (2018.01)
  *G07G 1/00* (2006.01)
  *G07G 1/14* (2006.01)

(52) U.S. Cl.
  CPC ............. *G07G 1/0009* (2013.01); *G06F 8/65* (2013.01); *G07G 1/14* (2013.01)

(58) Field of Classification Search
  CPC .......... G07G 1/0009; G07G 1/14; G06F 8/65; G06Q 20/202
  See application file for complete search history.

(56) References Cited

U.S. PATENT DOCUMENTS

| 9,594,586 | B2 * | 3/2017 | Shigeta | ............... G06F 9/45558 |
| 10,007,514 | B2 * | 6/2018 | Ando | ........................ G06F 8/71 |
| 11,687,302 | B2 * | 6/2023 | Ikeda | .................... G06F 3/1205 |
| | | | | 358/1.15 |
| 2008/0244229 | A1 * | 10/2008 | Yao | ...................... G06F 9/45533 |
| | | | | 712/205 |
| 2016/0300277 | A1 * | 10/2016 | Marlowe | .............. G06Q 10/083 |
| 2016/0313987 | A1 * | 10/2016 | Son | ........................... G06F 8/65 |

(Continued)

FOREIGN PATENT DOCUMENTS

| JP | 2011039967 A | * | 2/2011 |
| JP | 2015-095053 A | | 5/2015 |

(Continued)

OTHER PUBLICATIONS

JP 2011039967A—Temperature Control Device, 31 Pages. (Year: 2023).*

(Continued)

*Primary Examiner* — Tuyen K Vo
(74) *Attorney, Agent, or Firm* — FOLEY & LARDNER LLP

(57) ABSTRACT

An information processing apparatus includes a memory and a controller. The memory is configured to store first software and second software different from the first software. The controller is configured to enable execution of the first software and the second software when an elapsed time since an application of a program on security was last successfully performed is less than a predetermined time, and enable execution of the first software and disable execution of the second software when the elapsed time is greater than or equal to the predetermined time.

13 Claims, 6 Drawing Sheets

(56) References Cited

U.S. PATENT DOCUMENTS

| | | | | |
|---|---|---|---|---|
| 2019/0012163 A1* | 1/2019 | Konno | .................... | G06F 8/65 |
| 2021/0064673 A1* | 3/2021 | Murakami | .......... | G06F 3/04847 |
| 2023/0059572 A1* | 2/2023 | Yamamoto | ......... | H04N 1/32432 |

FOREIGN PATENT DOCUMENTS

| | | | | | | |
|---|---|---|---|---|---|---|
| JP | | 2019021263 A | * | 2/2019 | ........... | G06F 16/122 |
| JP | | 2021009654 A | * | 1/2021 | ............... | G06F 8/65 |

OTHER PUBLICATIONS

JP 2021009654A—Information Processing Apparatus, Information Processing Method, and Program, 12 Pages. (Year: 2023).*
JP 2019021263A—Information Processing Device and Program, 11 Pages. (Year: 2023).*

* cited by examiner

FIG. 3

| APPLICATION DATE AND TIME | APPLICATION FLAG |
|---|---|
|  |  |
|  |  |
|  |  |
| ⋮ | ⋮ |

1033

INFORMATION PROCESSING APPARATUS AND CONTROL PROGRAM THEREFOR

CROSS-REFERENCE TO RELATED APPLICATION

This application is based upon and claims the benefit of priority from Japanese Patent Application No. 2021-129746, filed on Aug. 6, 2021, the entire contents of which are incorporated herein by reference.

FIELD

Embodiments described herein relate to an information processing apparatus and a control program therefor.

BACKGROUND

In information processing apparatuses such as Personal Computers (PCs), Point of Sales (POS) terminals, and Internet Of Things (IoT) apparatuses, processes of applying programs for correcting problems, vulnerabilities, etc. of operating systems, software, or the like (i.e., the so-called security patches to software operating within the apparatuses themselves) are executed. The security patch is received from a server distributing the security patch via a communication network such as the Internet. However, there may be a case where the security patch is not applicable to software because communication between the server and the information processing apparatus is not available. In this case, for example, in a PC, the security patch may not be applied again depending on the management skills of an operator operating the PC. For example, in a POS terminal, a manager and an operator operating the POS terminal are different, and an operator not having detailed knowledge of the management of the POS terminal may continue to use the POS terminal because the operator is unaware or even if aware of non-application of the security patch without reporting that to the manager. Or, in an IoT apparatus used at home, a user using the IoT apparatus often fails to check the management status after installation of the apparatus, and application of the security patch may be left undone for a long period. Accordingly, a potential for damage such as computer virus infection is higher. Therefore, a system that may reduce damage on security in an information processing apparatus without application of a security patch is desired.

DESCRIPTION OF THE DRAWINGS

FIG. 3 is a diagram showing an example of a management list.

DETAILED DESCRIPTION

A challenge to be solved is to provide an information processing apparatus and a control program therefor that may reduce damage on security.

In one embodiment, an information processing apparatus includes a memory unit and a control unit. The memory unit stores first software and second software different from the first software. The control unit enables execution of the first software and the second software when a predetermined time does not elapse after application of a program on security is successfully performed, and enables execution of the first software and disables execution of the second software when the predetermined time elapses.

As below, one embodiment will be explained using the drawings. This embodiment exemplifies a POS terminal as an aspect of an information processing apparatus.

Figure 1:
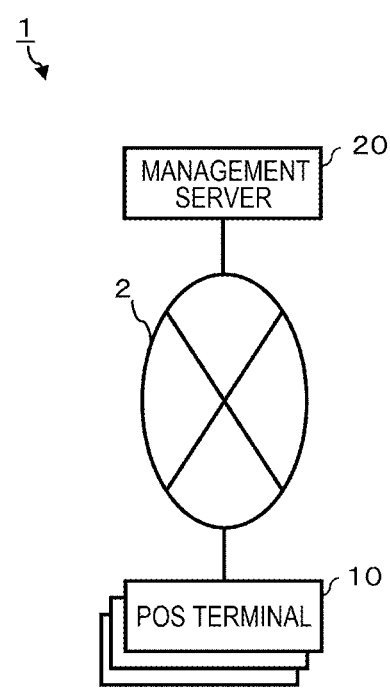
FIG. 1 is a diagram showing a schematic configuration of an information processing system according to one embodiment.

FIG. 1 is a diagram showing a schematic configuration of an information processing system 1 according to one embodiment. The information processing system 1 includes a plurality of POS terminals 10 and a management server 20. The POS terminals 10 and the management server 20 are connected to a communication network 2 such as a Local Area Network (LAN).

The POS terminal 10 registers sales data of merchandise purchased by a customer (the number of sold merchandise items, the sales amount, etc.) and calculates payment to be paid by the customer based on the registered sales data. The POS terminal 10 receives the payment and settles a business transaction with the customer. The POS terminal 10 is an example of an information processing apparatus.

The management server 20 provides a security patch to each POS terminal 10. The security patch is a program for correcting a problem, a vulnerability, etc. of an operating system, software, or the like. The security patch is an example of a program on security.

Figure 2:
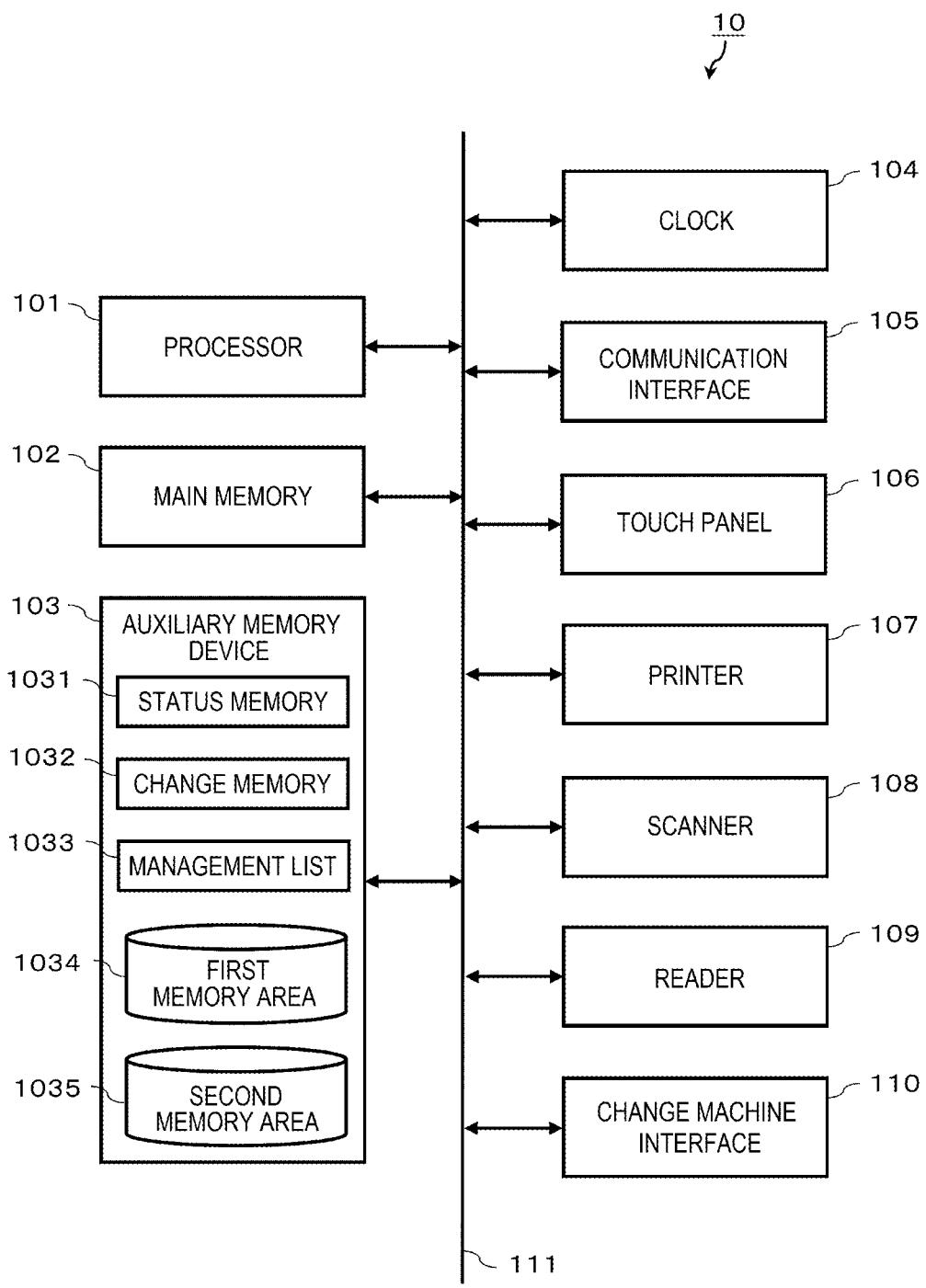
FIG. 2 is a block diagram showing a main part circuit configuration of a POS terminal.

FIG. 2 is a block diagram showing a main part circuit configuration of the POS terminal 10. The POS terminal 10 includes a processor 101, a main memory 102, an auxiliary memory device 103, a clock 104, a communication interface 105, a touch panel 106, a printer 107, a scanner 108, a reader 109, a change machine interface 110, and a system transmission line 111. The POS terminal 10 electrically connects the processor 101, the main memory 102, the auxiliary memory device 103, the clock 104, the communication interface 105, the touch panel 106, the printer 107, the scanner 108, the reader 109, and the change machine interface 110 to the system transmission line 111 directly or via a signal input output circuit. The POS terminal 10 forms a computer with the processor 101, the main memory 102, and the auxiliary memory device 103 and the system transmission line 111 connecting these.

The processor 101 corresponds to a brain portion of the computer. The processor 101 controls respective parts to realize various functions as the POS terminal 10 according to an operating system and application programs. The processor 101 is, for example, a Central Processing Unit (CPU). The processor 101 is an example of a control unit or a controller.

The main memory 102 corresponds to a main memory portion of the computer. The main memory 102 includes a non-volatile memory area and a volatile memory area. The main memory 102 stores the operating system and the application programs in the non-volatile memory area. The main memory 102 may store data necessary for execution of processes for the processor 101 to control the respective parts in the non-volatile or volatile memory area. The main memory 102 uses the volatile memory area as a work area in which data is appropriately rewritten by the processor 101. The non-volatile memory area is, for example, a Read Only Memory (ROM). The volatile memory area is, for example, a Random Access Memory (RAM).

The auxiliary memory device 103 corresponds to an auxiliary memory portion of the computer. For example, an Electric Erasable Programmable Read-Only Memory (EEPROM) (registered trademark), a Hard Disc Drive (HDD), a Solid State Drive (SSD), or a Self Encrypting Drive (SED), or the like is used as the auxiliary memory device 103. The auxiliary memory device 103 saves data used by the processor 101 performing various processes and data generated by the processes in the processor 101. The auxiliary memory device 103 may store the application programs. The auxiliary memory device 103 is an example of a memory unit.

The application programs stored by the main memory 102 or the auxiliary memory device 103 include a control program, which will be described later. The method of installing the control program in the main memory 102 or the auxiliary memory device 103 is not particularly limited. The control program may be recorded in a removable recording medium or the control program may be distributed by communication via a network, and thereby, installed in the main memory 102 or the auxiliary memory device 103. The recording medium may have any configuration as long as the medium may store a program such as a CD-ROM or a memory card and may be readable by an apparatus.

The clock 104 functions as a time information source of the POS terminal 10. The processor 101 tracks the current date and time based on the time information tracked by the clock 104.

The communication interface 105 is connected to the communication network 2. The communication interface 105 makes data communications according to a communication protocol between another apparatus connected via the communication network 2 and itself.

The touch panel 106 functions as an input device and a display device of the POS terminal 10. The touch panel 106 detects a touch position on a displayed image and outputs touch position information to the processor 101.

The printer 107 prints on receipt paper. The printed receipt paper is dispensed as, for example. a purchase receipt, a credit slip, or the like. The printer 107 is, for example, a thermal printer, an inkjet printer, or the like.

The scanner 108 reads a code symbol such as a barcode or a two-dimensional data code attached to merchandise, and outputs the read data to the processor 101. The scanner 108 may be of a type reading the code symbol by scanning of a laser beam or a type reading the code symbol from an image captured by an imaging device.

The reader 109 reads the data recorded in the recording medium and outputs the read data to the processor 101. The reader 109 is a magnetic card reader when the recording medium is a magnetic card and an integrated circuit (IC) card reader when the recording medium is a contact IC card. In a case of a recording medium using Radio Frequency Identification (RFID) such as a non-contact IC card or a smartphone, an RFID reader is used as the reader 109.

The change machine interface 110 inputs and outputs data signals to and from an automatic change machine. For example, the change machine interface 110 inputs inserted amount data from the automatic change machine. Further, the change machine interface 110 outputs change amount data to the automatic change machine. In this regard, in the automatic change machine, bills and/or coins corresponding to the change amount according to the change amount data is paid.

The POS terminal 10 having the above described configuration uses a part of the memory area of the auxiliary memory device 103 as a status memory 1031, a change memory 1032, a management list 1033 (see FIG. 3), a first memory or first memory area 1034, and a second memory or second memory area 1035.

The status memory 1031 stores data representing the access state to the second memory area 1035 (i.e., the so-called status). The second memory area 1035 will be described later. The access state to the second memory area 1035 includes an accessible state to the second memory area 1035 and an inaccessible state to the second memory area 1035. The status showing the accessible state to the second memory area 1035 is "0". The status showing the inaccessible state to the second memory area 1035 is "1".

The change memory 1032 stores a change flag. The change flag is 1-bit data for specification of a change from the inaccessible state to the second memory area 1035 to the accessible state. The change flag is set to "1" when the inaccessible state to the second memory area 1035 is changed to the accessible state. The initial state of the change flag is "0".

FIG. 3 is a diagram showing an example of the management list 1033. As shown in FIG. 3, the management list 1033 has areas for describing application date and times and application flags. The application date and time are a date and a time when a security patch application process is executed. The application flag is 1-bit data for specification of a success of application of the security patch. When the application of the security patch is successful, the application flag is set to "1". The success of the application of the security patch refers to a success of a software update process (i.e., a successful software update to the latest state). Or, when the application of the security patch is unsuccessful, the application flag is set to "0". The unsuccessfulness of the application of the security patch refers to an unsuccessfulness of the software update process (i.e., an unsuccessful software update to the latest state). Note that the management list 1033 is not only for the data of the above described items.

First software is stored in the first memory area 1034. The first software is the minimum required software for the operation of the POS terminal 10, (the so-called basic software). The first software is, for example, software for registration of sales data of purchased merchandise and settlements of business transactions. Second software is stored in the second memory area 1035. The second software is different software from the first software. The second software is, for example, software for improving convenience, comfort, etc. when the POS terminal 10 is used (the so-called applied software). That is, even when the second software fails to function or when the second software is not provided, the minimum required operation of the POS terminal 10 is not affected. The second software is, for example, software for a process using a point/rewards card issued to a point/rewards member. Note that, in the embodiment, both the first software and the second software are software relating to the operation of the POS terminal 10. That is, the second software is software having a relationship with the first software.

Here, the processor 101 controls access authority to the memory areas for reading, writing, etc. of various kinds of data stored in the memory areas. The processor 101 may set the access state to the second memory area 1035. When the processor 101 sets the state to the accessible state to the second memory area 1035, various kinds of data becomes readable and writable. Thereby, execution of the second software stored in the second memory area 1035 is enabled. When the processor sets the state to the inaccessible state to the second memory area 1035, various kinds of data become unreadable and unwritable. Thereby, the execution of the second software stored in the second memory area 1035 is disabled. Note that, for example, a function of setting the access state with respect to each memory area using an SED may be used.

Figure 4:
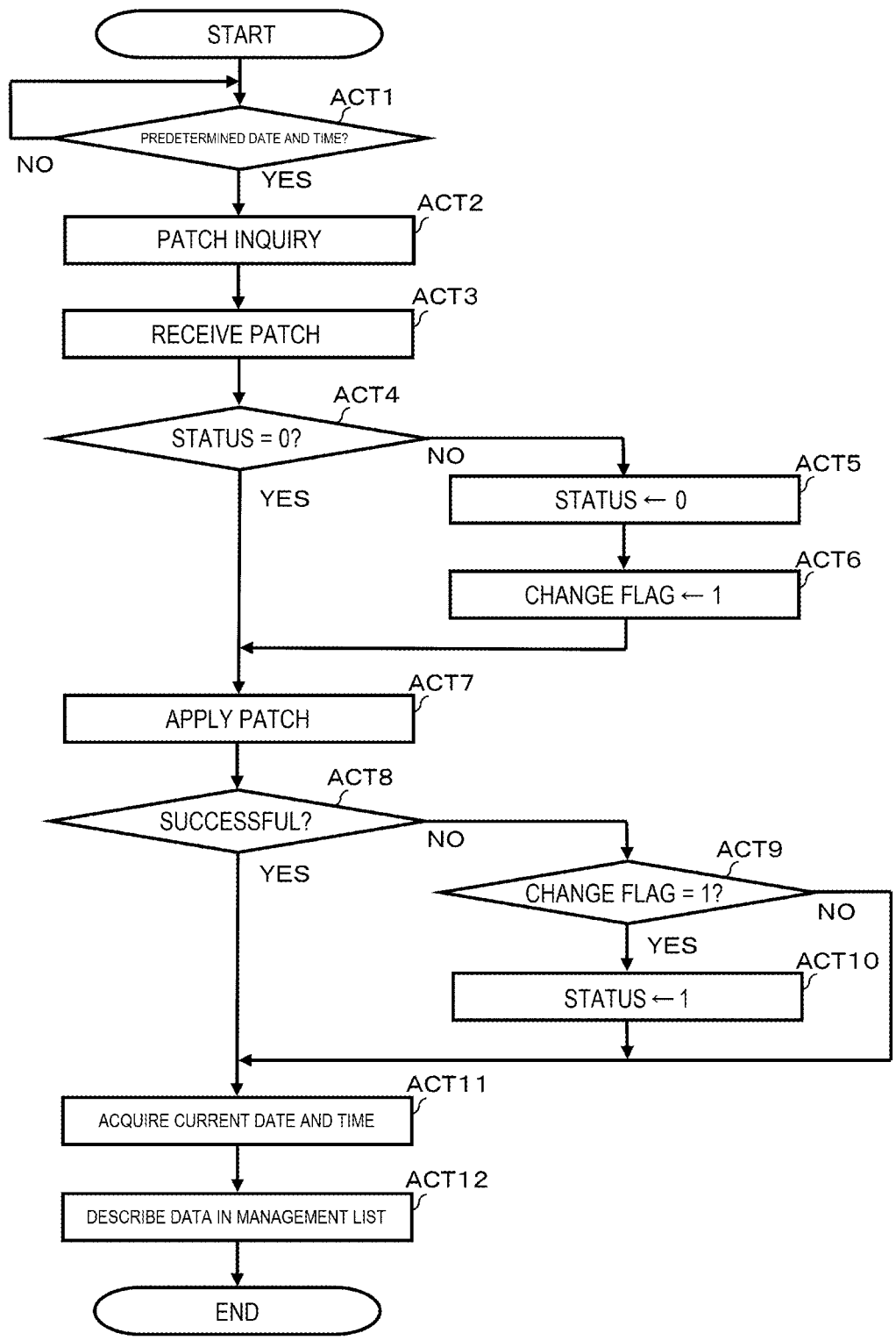
FIG. 4 is a flowchart showing a main part control procedure of a processor in the POS terminal.
Figure 5:
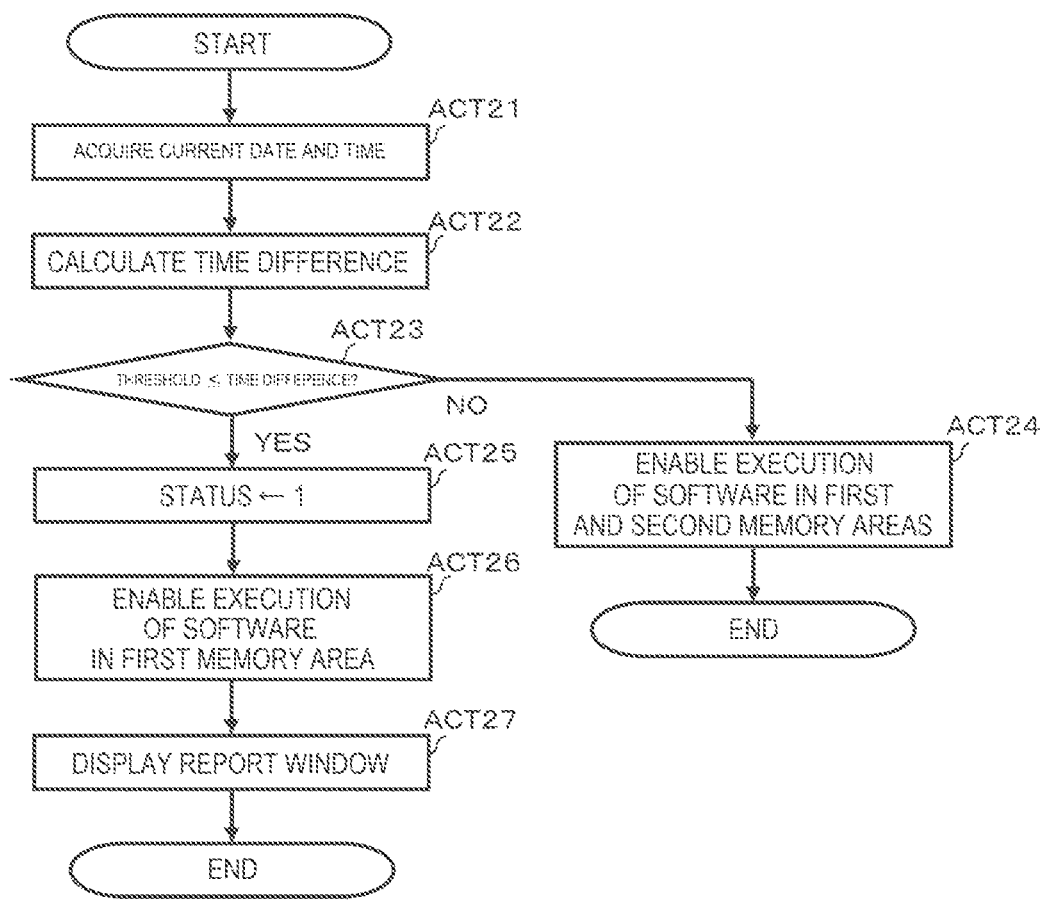
FIG. 5 is a flowchart showing the main part control procedure.

FIGS. 4 and 5 are flowcharts showing a main information process procedure executed by the processor 101 of the POS terminal 10 according to the control program. As below, operations of the information processing system 1 will be explained using these drawings. Note that the explanation of the operations to be described is an example. The procedure thereof is not particularly limited as long as the same results may be obtained.

In the POS terminal 10, the security patch application process is executed on a regular basis for updating software to the latest state. At a predetermined date and time, the processor 101 of the POS terminal 10 starts an information process in the procedure shown in the flowchart in FIG. 4. That is, the processor 101 waits until the predetermined date and time as ACT1. How to set the predetermined date and time may be arbitrary. The predetermined date and time may be a fixed date and time in the POS terminal 10 or can be changed to a desired date and time by a manager managing the POS terminal 10 or the like.

When the date and time come, the processor 101 determines YES at ACT1 and the process goes to ACT2.

The processor 101 inquires about a download of security patches of the management server 20 as ACT2. By the inquiry, the management server 20 transmits the security patches to the POS terminal 10. Then, the processor 101 receives the security patches as ACT3.

The processor 101 checks whether or not the status stored in the status memory 1031 is "0" as ACT4. When the status is not "0", that is, when the status is "1", the processor 101 determines "NO" at ACT4 and the process goes to ACT5.

The processor 101 updates the status to "0" as ACT5. That is, the processor 101 sets the state to the accessible state in the second memory area 1035. Thereby, various kinds of data stored in the second memory area 1035 become readable and writable, and execution of the security patch application process is enabled. The processor 101 updates the change flag stored in the change memory 1032 to "1" as ACT6.

When the status is "0", the process goes to ACT7.

The processor 101 applies the security patches to the first software stored in the first memory area 1034 and the second software stored in the second memory area 1035, respectively.

The processor 101 checks whether or not the security patch application is successful as ACT8. When the security patch application is successful, the processor 101 determines YES at ACT8 and the process goes to ACT11. The process at ACT11 will be described later.

When the security patch application is not successful, the processor 101 determines NO at ACT8 and the process goes to ACT9.

The processor 101 checks whether or not the change flag stored in the change memory 1032 is "1" as ACT9. When the change flag is "1", the processor 101 determines YES at ACT9 and the process goes to ACT10.

The processor 101 updates the status stored in the status memory 1031 to "1" as ACT10. That is, the processor 101 returns the status to the setting of the inaccessible state to the second memory area 1035 as the status before the security patch application. Then, the process goes to ACT11.

When the change flag is not "1", that is, the change flag is "0", the process goes to ACT11.

The processor 101 acquires the current date and time tracked by the clock 104 as ACT11.

The processor 101 describes data in the management list 1033 as ACT12. Specifically, when the security patch application is successful, the processor 101 correlates and describes the current date and time acquired in the process at ACT11 as the application date and time with "1" as the application flag in the management list 1033. When the security patch application is not successful, the processor 101 correlates and describes the current date and time acquired in the process at ACT11 as the application date and time with "0" as the application flag in the management list 1033. Here, the processor 101 ends the information process of the procedure shown in the flowchart in FIG. 4.

Now, an operator of the POS terminal 10 first starts up the POS terminal 10. The operator of the POS terminal 10 is, for example, a person in charge of settlement service of the store. When the POS terminal 10 is started up, the processor 101 of the POS terminal 10 starts the information process of the procedure shown in the flowchart in FIG. 5.

The processor 101 acquires the current date and time tracked by the clock 104 as ACT21.

The processor 101 calculates a time difference between the application date and time described in the management list 1033 and the current date and time acquired in the process at ACT21 with reference to the management list 1033 as ACT22.

Specifically, when "1" is described as the application flag in the last line of the management list 1033, the processor 101 calculates a time difference between the application date and time described in correlation with the application flag and the current date and time acquired in the process at ACT21. When "0" is described as the application flag in the last line of the management list 1033, the processor 101 searches the management list 1033 backward in time from the application date and time described in correlation with the application flag. Then, when detecting "1" described as the application flag, the processor 101 calculates a time difference between the application date and time described in correlation with the application flag and the current date and time acquired in the process at ACT21. That is, the processor 101 calculates the day and time elapsed after the application date and time when the security patch application is successful until the current date and time.

The processor 101 checks whether or not the time difference is equal to or more than a threshold as ACT23. How to set the threshold is arbitrary. The threshold may be fixed date and time in the POS terminal 10 or can be changed to a desired threshold by a manager managing the POS terminal 10. The threshold is an example of a predetermined time. When the time difference is less than the threshold, the processor 101 determines NO at ACT23 and the process goes to ACT24.

The processor 101 enables execution of the first software stored in the first memory area 1034 and the second software stored in the second memory area 1035 as ACT24. That is, if the day and time elapsed after the success of the security patch application is less than the threshold, the security is determined as being maintained and the execution of the first software stored in the first memory area 1034 and the second software stored in the second memory area 1035 is enabled. Here, the processor 101 ends the information process of the procedure shown in the flowchart in FIG. 5.

When the time difference is equal to or more than the threshold, the processor 101 determines YES at ACT23 and the process goes to ACT25.

The processor 101 updates the status stored in the status memory 1031 to "1" as ACT25. That is, the processor 101 sets the status to the inaccessible state to the second memory area 1035.

The processor 101 enables execution of the first software stored in the first memory area 1034 as ACT26. That is, if the day and time elapsed after the success of the security patch application is equal to or more than the threshold, the security is determined as being possibly not maintained and the execution of only the first software as the basic software is enabled.

The processor 101 causes the touch panel 106 to display a report window SC (see FIG. 6) as ACT27.

Figure 6:
FIG. 6 is a diagram showing an example of a report window.

FIG. 6 is a diagram showing an example of the report window SC. As shown in FIG. 6, a message prompting the operator of the POS terminal 10 to update the software to the latest state and reporting disability of execution of the second software as the applied software is displayed in the report window SC. Note that the contents and an image of the text data displayed in FIG. 6 are examples.

Here, the processor 101 ends the information process of the procedure shown in the flowchart in FIG. 5.

As is clear from the above description, the POS terminal 10 as the information processing apparatus includes the auxiliary memory device 103 and the processor 101. The auxiliary memory device 103 stores the first software and the second software different from the first software. The processor 101 executes the processes from ACT23 to ACT26 in FIG. 5, and thereby, when the predetermined time does not elapse after the success of the security patch application, enables execution of the first software and the second software and, when the predetermined time elapses, enables execution of the first software and disables execution of the second software.

Therefore, if the day and time elapsed after the success of the security patch application is less than the threshold, the security is determined as being maintained and the execution of the first software and the second software is enabled. On the other hand, if the day and time elapsed after the success of the security patch application is equal to or more than the threshold, the security is determined as being possibly not maintained and execution of the second software is disabled and execution of only the first software is enabled. Accordingly, damage on security may be reduced.

The first software is the basic software and the second software is the applied software. Even when the security is possibly not maintained, the basic software can be executed. Therefore, the operator may use the POS terminal 10 without affecting the minimum required operation of the POS terminal 10.

Further, the auxiliary memory device 103 includes the first memory area 1034 storing the first software and the second memory area 1035 storing the second software. When the predetermined time does not elapse after the success of the application of the program on security, the processor 101 enables execution of the first software stored in the first memory area 1034 and execution of the second software stored in the second memory area 1035 and, when the predetermined time elapses, enables execution of the first software stored in the first memory area 1034 and disables the execution of the second software stored in the second memory area 1035. Therefore, the memory area is divided into a plurality of areas, and thereby, management relating to security may be performed with respect to each memory area.

When the predetermined time elapses after the success of the application of the program on security, the processor 101 reports that the execution of the second software is disabled by executing the process at ACT27 in FIG. 5.

When the execution of the second software is disabled, the operator of the POS terminal 10 does not know whether the disability is caused by a failure of the POS terminal 10 or by the security patch application process at a glance. The report window SC is displayed on the touch panel 106, and thereby, the operator may know that the execution of the second software is disabled due to the security patch application process. Further, the message prompting update of the software to the latest state is displayed on the report window SC, and thereby, the operator may grasp the state of the POS terminal 10. Therefore, software update is not left undone for a long period and damage on the security may be prevented.

As above, the embodiments of the information processing apparatus and the control program therefor are explained, however, the embodiments are not limited to those.

In the above described embodiments, the POS terminal 10 as the information processing apparatus is exemplified. The information processing apparatus may be, for example, a PC, an IoT apparatus, or the like.

In the above described embodiments, the POS terminal 10 having the first memory area 1034 and the second memory area 1035 as a part of the memory area of the auxiliary memory device 103 is exemplified.

For example, the POS terminal 10 may use a part of the non-volatile memory area of the main memory 102 as the first memory area 1034 and a part of the volatile memory area of the main memory 102 as the second memory area 1035. In this case, the security patch application process may be executed on only the second software stored in the second memory area 1035. In this case, the main memory 102 is an example of the memory unit.

In the above described embodiments, the second software as the software having a relationship with the first software is exemplified. For example, the first software and the second software may have no relationship. For example, when the information processing apparatus is a PC, the first software may be software for managing data transmitted from an IoT apparatus and the second software may be software relating to a game downloaded through the Internet or the like. That is, the second software may be software having no relationship with the first software.

In the above described embodiments, the message displayed in the report window SC for prompting the operator of the POS terminal 10 to update the software to the latest state and reporting disability of the second software is exemplified. For example, explanation of a procedure of updating the software to the latest state may be further displayed in the report window SC.

While certain embodiments have been described, these embodiments are presented as examples, but not intended to limit the scope of the invention. These novel embodiments may be implemented in other various forms and various omissions, replacements, changes may be made without departing from the scope of the invention. These embodiments or their modifications are within the scope of the invention and within the scope of the invention described in claims and equivalents thereof.

What is claimed is:

1. An information processing apparatus comprising:
 a memory configured to store first software and second software different from the first software; and
 a controller configured to:
 enable execution of the first software and the second software when an elapsed time since an application of a program on security was last successfully performed is less than a predetermined time; and enable execution of the first software and disable execution of the second software when the elapsed time is greater than or equal to the predetermined time.

2. The information processing apparatus according to claim 1, wherein the first software is a basic software or a required software for a minimum required operation of the information processing apparatus, and wherein the second software is an applied software.

3. The information processing apparatus according to claim 2, wherein the applied software is software that does not affect the minimum required operation of the information processing apparatus.

4. The information processing apparatus according to claim 1, wherein the memory includes a first memory area configured to store the first software and a second memory area configured to store the second software, and wherein the control unit is configured to:

enable execution of the first software stored in the first memory area and the second software stored in the second memory area when the elapsed time is less than the predetermined time; and enable execution of the first software stored in the first memory area and disable execution of the second software stored in the second memory area when the elapsed time is greater than or equal to the predetermined time.

5. The information processing apparatus according to claim 1, wherein the controller is configured to provide a notification reporting that execution of the second software is disabled.

6. The information processing apparatus according to claim 5, wherein the notification is provided to a display device.

7. The information processing apparatus according to claim 6, wherein the notification requests that a user applies the newest program on security.

8. The information processing apparatus according to claim 6, further comprising the display device.

9. An information processing apparatus comprising:
a memory having:

a first memory area configured to store first software that is required software for a minimum required operation of the information processing apparatus; and a second memory area that is accessible separately from the first memory area, the second memory configured to store second software, the second software is software that is different from the first software and that does not affect the minimum required operation of the information processing apparatus; and a processor having programmed instructions to:

enable execution of the first software stored in the first memory area and the second software stored in the second memory area when an elapsed time since successful application of a security patch for the information processing apparatus is less than a threshold time; and enable execution of the first software and disable execution of the second software when the elapsed time is greater than or equal to the threshold time.

10. The information processing apparatus according to claim 9, wherein the processor has programmed instructions to provide a notification on a display device reporting that execution of the second software is disabled.

11. The information processing apparatus according to claim 10, wherein the notification requests that a user applies the newest security patch to facilitate re-enabling the second software.

12. The information processing apparatus according to claim 10, further comprising the display device.

13. A method for controlling a computer of an information processing apparatus including a memory that stores first software and second software different from the first software, the method comprising:

enabling execution of the first software and the second software when an elapsed time since successful application of a security patch for the information processing apparatus is less than a threshold time; and enabling execution of the first software and disabling execution of the second software when the elapsed time is greater than or equal to the threshold time.

\* \* \* \* \*